(12) United States Patent
Kondo

(10) Patent No.: US 7,592,062 B2
(45) Date of Patent: Sep. 22, 2009

(54) STAIN-PROOFING AGENT AND BUILDING BOARD

(75) Inventor: Michio Kondo, Nagoya (JP)

(73) Assignee: Nichiha Corporation, Nagoya-Shi (JP)

( * ) Notice: Subject to any disclaimer, the term of this patent is extended or adjusted under 35 U.S.C. 154(b) by 382 days.

(21) Appl. No.: 11/355,072

(22) Filed: Feb. 16, 2006

(65) Prior Publication Data

US 2006/0177589 A1   Aug. 10, 2006

(51) Int. Cl.
*B32B 25/02* (2006.01)

(52) U.S. Cl. .................... 428/297.1; 428/221; 428/387; 428/446

(58) Field of Classification Search ................ 428/212, 428/221, 297.1, 387; 52/408, 746.11
See application file for complete search history.

(56) References Cited

U.S. PATENT DOCUMENTS

| | | | | |
|---|---|---|---|---|
| 3,808,027 A | * | 4/1974 | Anderson et al. ........... | 428/332 |
| 4,258,102 A | * | 3/1981 | Traver et al. ................ | 428/331 |
| 4,818,595 A | * | 4/1989 | Ellis ............................ | 442/68 |
| 5,130,184 A | * | 7/1992 | Ellis ............................ | 442/295 |
| 6,620,487 B1 | * | 9/2003 | Tonyan et al. ............... | 428/192 |
| 2003/0082357 A1 | * | 5/2003 | Gokay et al. ................ | 428/212 |
| 2004/0235984 A1 | * | 11/2004 | Nicholl et al. .............. | 523/200 |
| 2006/0177589 A1 | * | 8/2006 | Kondo ........................ | 427/387 |
| 2007/0026155 A1 | * | 2/2007 | Ukai et al. .................. | 427/387 |
| 2007/0048504 A1 | * | 3/2007 | DiMario .................. | 428/195.1 |
| 2007/0130862 A1 | * | 6/2007 | Semmens et al. ............. | 52/408 |
| 2007/0130864 A1 | * | 6/2007 | Semmens et al. ............. | 52/408 |

FOREIGN PATENT DOCUMENTS

| | | |
|---|---|---|
| JP | 06-071219 | 3/1994 |
| JP | 2002-338943 | 11/2002 |

* cited by examiner

*Primary Examiner*—N. Edwards
(74) *Attorney, Agent, or Firm*—Birch, Stewart, Kolasch & Birch, LLP

(57) ABSTRACT

Provided is a stain-proofing agent which forms a super hydrophilic stain-proofing film upon application to a surface of a substrate, which comprises using fumed silica dispersed in an aqueous solvent.

4 Claims, No Drawings

STAIN-PROOFING AGENT AND BUILDING BOARD

BACKGROUND OF THE INVENTION

1. Field of the Invention

The present invention relates to a stain-proofing agent (i.e. an agent which enables release of soils and stains by the action of water and the like) used for stain-proofing treatment of the surfaces, for example, of wood fiber cement boards, calcium silicate boards, cement (concrete) boards, metal plates or boards, or glass plates or boards, as well as to a building board treated with the stain-proofing agent.

2. Description of the Prior Art

Architectural substrate boards such as, for example, external wall materials such as siding boards are generally coated with a coating composition on their surfaces and are applied with a stain-proofing agent which forms a stain-proofing film having a self-cleaning function to remove stains adhered to the surfaces after attachment.

As this kind of stain-proofing agent has been used such an agent which forms a super hydrophilic stain-proofing film on the surface to be treated. Upon application of the stain-proofing agent onto the surface of a substrate, a super hydrophilic stain-proofing film is formed thereon. When stains are attached to the surface of the substrate, water applied to the surface is absorbed by the super hydrophilic stain-proofing film and, as a result, the stains float on the water and are washed away together with the water (i.e. self-cleaning effect).

In order to form a super hydrophilic stain-proofing film on the surface of a substrate, mainly an aqueous dispersion of silica fine particles (colloidal silica) has been hitherto used.

For example, Japanese Laid-open Patent Publication No. 6-71219 gazette (JP 6-71219 A) discloses a method for forming a stain-proofing film which comprises applying an aqueous dispersion of colloidal silica having an average particle diameter of not more than 100 nm to a coat of an aqueous emulsion of a synthetic resin to form a film of colloidal silica on the surface of the coat.

Japanese Laid-open Patent Publication No. 2002-338943 gazette (JP 2002-338943 A) discloses a method for forming a stain-proofing layer which comprises applying a liquid containing colloidal silica and an alumina/aluminum-magnesium composite oxide for providing water-proof and alkali-proof properties to the coated surface.

The above-described silica fine particles give super hydrophilicity to the treated surface of the substrate owing to the presence of silanol group on the surface of the particles.

SUMMARY OF THE INVENTION

The above-described silica fine particles contain a number of vicinal silanol groups in which silanol groups present on the surface of the particles are adjacent closely to one another and the vicinal silanol groups are mutually hydrogen-bonded. Since the vicinal silanol groups are decreased in free silanol group (i.e. single silanol group) which participates in hydrophilicity and have low surface activity, the fixing property of the silica fine particles to the surface of a substrate is insufficient. Thus the silica fine particles are liable to flow out upon exposure to rain water, and thus long-term stain-proofing effect is not expectable. In order to obtain a stain-proofing film having high hydrophilicity, it is necessary to increase the concentration of silica fine particles in the aqueous dispersion since the concentration of single silanol group contained in the silica fine particles is not so high. However, if the concentration of silica particles is increased, the resulting aqueous dispersion becomes expensive.

In addition, silica fine particles have a particle diameter on the order of nanometer (not more than 100 nm). Therefore, when a coating composition is applied to the surface of a substrate and then stain-proofing treatment is effected thereon, silica particles may be involved in expansion and contraction of the coat caused by absorption and desorption of moisture and a change in environmental temperature and thus may be embedded in the coat to decrease their stain-proofing effect.

As a means to solve the above-described conventional problems, the present invention provides a stain-proofing agent which forms a super hydrophilic stain-proofing film upon application to a surface of a substrate, which comprises using fumed silica dispersed in an aqueous solvent. The aqueous solvent is preferably a mixed solvent of water and an alcohol, and is more preferably incorporated with a surfactant additionally.

According to the present invention, there is also provided a building board having a super hydrophilic stain-proofing film formed by applying the above-described stain-proofing agent on a surface of a substrate followed by drying. Preferably, a coating composition is applied onto the surface of the substrate and the stain-proofing agent is applied onto the resulting coat while it is in semi-drying state followed by heating and drying. A wood fiber cement board suitable for external wall members or the like is suitable as the substrate of the building board.

Mode of Action

Fumed silica is prepared by, for example, hydrolyzing silicon tetrachloride in oxygen-hydrogen flame. The particle diameter of the primary particle thereof is in a range of from about 7 to 40 nm. When it is dispersed in an aqueous solvent, particles associate to form a network structure and give secondary particles having a particle diameter of several hundreds nanometers (about 500 nm).

Even in such association state of the particles, fumed silica contains free silanol groups (single silanol groups) on the surface thereof in a high concentration, has a high activity and gives a high super hydrophilicity to the surface of the substrate. In addition, owing to a high surface activity and formation of a network structure upon association, the apparent molecular weight increases. Owing to the high surface activity and increased apparent Van der Waals force, fixing property of fumed silica to the substrate surface is increased, and the substrate surface can retain good super hydrophilicity, i.e. stain-proofing property, for a long period of time.

When a building board is used as a substrate and a coating composition is applied to the surface of the building board and then the stain-proofing agent is applied while the resulting coat is in semi-dried state, namely, the stain-proofing agent is applied while the coat on the surface of the substrate is in a semi-hardened state and is adhesive, the fumed silica is slightly embedded in the coat, whereby the adhesion of the resulting stain-proofing layer to the coat is enhanced. Since the fumed silica has become bulky upon association of the particles as described above, it is not totally embedded in the coat although it may somewhat get thereinto. Even if the coat expands or contracts due to absorption or desorption of moisture or change in environmental temperature, the fumed silica is not involved in the coat and not totally embedded therein, whereby stain-proofing property is not lowered.

When the stain proofing agent is a dispersion of fumed silica in a solvent containing an alcohol, water and preferably a surfactant, wettability of the agent with the coat is enhanced owing to the surface tension-lowering action of the alcohol and the surfactant and the affinity to the coat is increased, thereby increasing the adhering force of the formed stain-proofing layer to the coat. Moreover, the fumed silica is uniformly dispersed without settling down by the presence of the surfactant.

Effect

Since fumed silica containing a number of single silanol groups present on the surface is used in the stain-proofing agent of the present invention, the stain-proofing agent has a high fixing property to a substrate and exhibits significant lasting stain-proofing effect.

DETAILED DESCRIPTION OF THE INVENTION

The invention will be explained below in detail.

[Fumed Silica]

The fumed silica used in the present invention can be prepared by burning and hydrolyzing a volatile silicon compound such as silicon tetrachloride in a gas phase in, for example, oxygen-hydrogen flame as described above.

Primary particle diameter of the fumed silica is in a range of from about 7 to 40 nm. However, when it is dispersed in an aqueous solvent, the particles associate to form network structures and provide secondary particles of several hundreds nanometers (about 500 nm) in diameter.

The fumed silica has a specific surface area in a range of from about 500,000 to 2,000,000 $cm^2/g$ and contains 2 to 3, or more, as necessary, single silanol groups per $nm^2$. Thus, the fumed silica has a high surface activity and imparts high super hydrophilicity to the surface of a substrate.

[Alcohol]

In the present invention, it is desirable to add an alcohol to water as a solvent for dispersing the fumed silica. The alcohol used in the present invention is desirably a water-soluble alcohol such as methanol, ethanol or isopropanol. The alcohol lowers the surface tension of the stain-proofing agent of the present invention and increases affinity of the agent to an underlaying substrate or a coat formed on the substrate, thereby enhancing wettability of the agent.

[Surfactant]

The stain-proofing agent of the present invention is desirably incorporated with a surfactant. As the surfactant may be used any of usual anionic, nonionic and cationic surfactants. Examples of the anionic surfactant include higher alcohol sulfates (Na salts or amine salts), alkylally sulfonates (Na salts or amine salts), alkylnaphthalene sulfonates (Na salts or amine salts), alkylnaphthalene sulfonate condensates, alkyl phosphates, dialkyl sulphosuccinates, rosin soaps, and fatty acid salts (Na salts or amine salts). Examples of the nonionic surfactant include polyoxyethylene alkyl ethers, polyoxyethylene alkyl phenol ethers, polyoxyethylene alkyl esters, polyoxyethylene alkyl amines, polyoxyethylene alkylol amines, polyoxyethylene alkyl amides, sorbitan alkyl esters, and polyoxyethylene sorbitan alkyl esters. Examples of the cationic surfactant include octadecyl amine acetates, acetates of imidazoline derivatives, polyalkylene polyamine derivatives and their salts, octadecyltrimethyl ammonium chloride, trimethylaminoethylalkyl amide halogenides, alkyl pyridium sulfates, and alkyltrimethyl ammonium halogenides. A mixture of two or more of the surfactants may be used. These examples do not restrict the invention.

Both the surfactant and the alcohol lower surface tension of the stain-proofing agent of the present invention, favorably disperse the fumed silica in the agent, and increase affinity to the underlying coat.

The stain-proofing agent of the present invention usually contains 0.1 to 10% by mass, preferably 0.5 to 6% by mass of the fumed silica, 2 to 10% by mass of the alcohol, and 0.01 to 0.25% by mass of the surfactant, the remainder being water.

If the alcohol is contained in an amount of less than 2% by mass, wettability of the stain-proofing agent deteriorates, whereas if it is contained in an amount of more than 10% by mass, volatility of the resulting solvent becomes so high as to adversely affect coating operation. If the surfactant is contained in an amount of less than 0.01% by mass, surface tension-lowering effect and fumed silica-dispersing effect brought about by the surfactant are not remarkable whereas if it is contained in an amount of more than 0.25% by weight, the resulting stain-proofing layer is adversely affected in terms of strength, water resistance, durability and the like. Thus, it is desirable that the agent has a surface tension not more than 20 dyne/cm at 25° C.

The substrate to be applied with the stain-proofing agent of the invention is principally a building board such as an external wall material. As the building board may be used a wood fiber cement board prepared by molding and hardening a mixture mainly consisting of a wood reinforcing material such as wood chip, wood fiber bundle, wood pulp, woodwool, or wood flour and a hydraulic cement material, and the surface of the wood fiber cement board may have a concavo-convex pattern formed by embossing or the like. Coating is applied onto the surface of the board. Coating is effected by using an organic coating composition such as an acrylic resin coating composition, an acryl-silicone resin coating composition, or an acryl-urethane resin coating composition, or an inorganic coating composition such as a phosphate-based coating composition, or a metal oxide-based coating composition. Usually, three-ply coating consisting of under coating, intermediate coating and top coating, or two-ply coating consisting of under coating and top coating is applied.

As the coating composition used for the coating, it is desirable to use an aqueous emulsion coating composition such as a coating composition of an aqueous emulsion of acrylic resin. This is because a coat formed by the aqueous emulsion coating composition contains a hydrophilic component such as a surfactant and thus has a high affinity to the aqueous stain-proofing agent.

In the present invention, the stain-proofing agent is applied to a coat formed by applying a coating composition to the surface of the substrate while the coat is in semi-dried state, namely, semi-hardened state. In the case of two-ply or three-ply coating, the stain-proofing agent is applied while the coat formed by top coating is in semi-dried state.

The "coat in semi-dried state" means a state in which a solvent or water is not completely evaporated in the case where a solvent type coating composition or an aqueous emulsion coating composition is used, or a state in which a resin vehicle or an inorganic vehicle in a coating composition is not completely hardened, i.e. in semi-hardened state, in the case where a solvent-free type coating composition is used.

The semi-dried state of a coat is usually realized in 10 to 60 seconds after formation of the coat by coating. When a solvent type coating composition or an aqueous emulsion coating composition is used, the solid content increases from 30-50% by mass to 60-80% by mass during this period.

In the semi-dried state of the coat, fumed silica in the stain-proofing agent slightly gets into the coat, and thus the adhesive force of the stain-proofing layer to the coat is enhanced without causing mixing of the stain-proofing layer and the coat.

The substrate to be used in the invention other than the above-mentioned building boards includes, for example, calcium silicate boards, cement (concrete) boards, metal boards or plates and glass boards or plates.

A method desirable for applying the stain-proofing agent to the surface of the substrate includes spray coating. The spray coating includes, for example, low pressure airless spray coating, coating by means of a Bell type coating machine and electrostatic coating. The other coating methods may include brushing, roll coater coating, and knife coater coating.

In the spray coating, the stain-proofing agent is atomized to mist and the mist adheres to the surface of the substrate with a concavo-convex patter, whereby the agent is readily fixed to the surface.

EXAMPLES 1-11, COMPARATIVE EXAMPLES 1-3

Stain-proofing agents were prepared by adding the components shown in Table 1 to water and mixing them.

For dispersion of fumed silica, a bead mill was used and then dispersion by means of ultrasonic wave was effected for 40 minutes. Onto the surface of a wood fiber-containing calcium silicate board was applied an aqueous styrene-acrylic coating composition to give a substrate to be used for confirming stain-proofing effect of the present invention.

Each of the stain-proofing agents having a composition shown in Table 1 was applied to the surface of the substrate prepared as described above in an amount of 5 g of the stain-proofing agent per sq.ft, and the coated substrate was dried at normal temperature for use in a test.

TABLE 1

| Component | Example | | | | | | | | | | | Comparative Example | | |
|---|---|---|---|---|---|---|---|---|---|---|---|---|---|---|
| (% by mass) | 1 | 2 | 3 | 4 | 5 | 6 | 7 | 8 | 9 | 10 | 11 | 1 | 2 | 3 |
| Fumed silica | 0.5 | 1.5 | 2 | 4 | 6 | 0.5 | 1.5 | 2 | 0.5 | 1.5 | 2 | 0 | | |
| Colloidal silica | | | | | | | | | | | | | 2 | 6 |
| Surfactant* | | | | | | 0.2 | 0.2 | 0.2 | | | | | | |
| Isopropyl alcohol | | | | | | | | | 5 | 5 | 5 | | 5 | 5 |

*sodium lauryl sulfonate

Test 1
Each of the test samples of Examples 1-11 and Comparative Examples 1-3 thus prepared was fixed to a stand to face toward the south and have a tilt angle of 30°, and exposed to the outside air for two months to confirm the stain-proofing effect thereof. For evaluation of the degree of stain, a difference ($\Delta L$) in lightness (L value) measured by Minoruta color difference meter CR 300 was used. The results are shown in Table 2.

Test 2
Each of the test samples of Examples 1-11 and Comparative Examples 1-3 prepared under similar conditions was washed with water under high pressure for 1 minute, and change in the contact angle between water and the test sample before and after washing was measured to confirm hydrophilization effect. The results are shown in Table 2.

Test 3
Each of the test samples of Examples 1-11 and Comparative Examples 1-3 prepared under similar conditions was immersed in water kept at 25° C. for three days, and change in the contact angle between water and the test sample before and after immersion was measured to confirm hydrophilization effect. The results are shown in Table 2.

TABLE 2

|  |  |  | Example | | | | | | | | | | | Comparative Example | | |
|---|---|---|---|---|---|---|---|---|---|---|---|---|---|---|---|---|
|  |  |  | 1 | 2 | 3 | 4 | 5 | 6 | 7 | 8 | 9 | 10 | 11 | 1 | 2 | 3 |
| Test 1 | ΔL |  | 4.8 | 3.2 | 1.6 | 1.5 | 1.3 | 4.5 | 3.3 | 1.8 | 4.4 | 3.6 | 2.0 | 6.5 | 4.1 | 1.8 |
| Test 2 | Contact angle θ (°) | Before washing | 0 | 0 | 0 | 0 | 0 | 0 | 0 | 0 | 0 | 0 | 0 | 81 | 0 | 0 |
|  |  | After washing | 58 | 25 | 0 | 0 | 0 | 36 | 20 | 0 | 55 | 31 | 0 | 72 | 45 | 20 |
| Test 3 | Contact angle θ (°) | Before immersion | 0 | 0 | 0 | 0 | 0 | 0 | 0 | 0 | 0 | 0 | 0 | 88 | 0 | 0 |
|  |  | After immersion | 62 | 32 | 0 | 0 | 0 | 49 | 26 | 0 | 58 | 30 | 0 | 70 | 42 | 22 |

Results of Test 1

Referring to Table 2, the ΔL Of the test sample of Comparative Example 1 which has not been treated is as high as 6.5; the ΔL (4.1) of the test sample of Comparative Example 2 which has been treated with the stain-proofing agent containing 2% by mass of colloidal silica is approximately the same as the ΔL (4.4) of the test sample of Example 9 which has been treated with the stain-proofing agent containing 0.5% by mass of fumed silica; the ΔL (1.8) of the test sample of Comparative Example 3 which has been treated with the stain-proofing agent containing 6% by mass of colloidal silica is the same as the ΔL (1.8) of the test sample of Example 8 which has been treated with the stain-proofing agent containing 2% by mass of fumed silica; the ΔL (1.6) of the test sample of Example 3 which has been treated with the stain-proofing agent containing 2% by mass of fumed silica is far less than the ΔL (4.1) of the test sample of Comparative Example 2; and the ΔL (1.3) of the test sample of Example 5 which has been treated with the stain-proofing agent containing 6% by mass of fumed silica is less than the ΔL (1.8) of the test sample of Comparative Example 3. Thus, it is confirmed that a stain-proofing agent containing fumed silica exhibits more durable stain-proofing effect than that containing colloidal silica.

Results of Tests 2 and 3

With regard to Test 2, the contact angle θ of the test sample of Comparative Example 1 which has not been treated is as high as 81° before washing and is slightly lowered to 72° after washing. All of the test samples of Comparative Example 2 and 3 in which colloidal silica is used and those of Examples 1-11 in which fumed silica is used have a contact angle θ of 0° (θ=0°) before washing, and exhibit good hydrophilicity. After washing, however, θ=45° in Comparative Example 2 as compared to θ=0° in Example 3, showing that the surface treated with a stain-proofing agent containing fumed silica has a larger hydrophilicity than the surface treated with a stain-proofing agent containing colloidal silica after washing. In Test 3, the test sample of Comparative Example 1 which has not been treated exhibits a contact angle value as large as 88° (θ=88°) before immersion and 70° (θ=70°) after immersion; all the test samples of Comparative Examples 2 and 3 as well as Examples 1-11 have a contact angle value of 0° (θ=0°) before immersion, showing good hydrophilicity, whereas, after immersion, θ=42° in Comparative Example 2, θ=0° in Example 3, θ=22° in Comparative Example 3 and θ=0° in Example 5, which shows that the surface treated with a stain-proofing agent using colloidal silica is largely decreased in hydrophilicity by immersion in water.

INDUSTRIAL APPLICABILITY

The surface of a substrate treated with the stain-proofing agent of the present invention exhibits durable stain-proofing property and the stain-proofing agent is useful for building materials such as external wall materials which are exposed to the outside air.

What is claimed is:

1. A building board having a super hydrophilic stain-proofing film on a surface of the board, wherein the stain-proofing film is formed by first applying a coating composition to the surface of a substrate, and then applying a stain-proofing agent to the substrate while the first-applied coating composition is in a semi-dried state, and thereafter drying the coated substrate;

wherein the stain-proofing agent comprises fumed silica dispersed in a mixture of water and alcohol and forms a super hydrophilic stain-proofing film upon drying on the surface of the substrate.

2. The building board according to claim 1, wherein the mixture of water and alcohol is incorporated with a surfactant.

3. The building board according to claim 1, wherein the substrate is a wood fiber cement board.

4. The building board according to claim 2, wherein the substrate is a wood fiber cement board.

* * * * *